US009317667B2

(12) United States Patent
Cain et al.

(10) Patent No.: US 9,317,667 B2
(45) Date of Patent: Apr. 19, 2016

(54) AUTOMATIC COMPUTER PROGRAM OBFUSCATION SYSTEM

(71) Applicant: Cisco Technology Inc., San Jose, CA (US)

(72) Inventors: Harel Cain, Jerusalem (IL); Guy Adini, Rehovot (IL); Nir Moshe, Jerusalem (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 376 days.

(21) Appl. No.: 13/945,264

(22) Filed: Jul. 18, 2013

(65) Prior Publication Data

US 2014/0229517 A1  Aug. 14, 2014

(30) Foreign Application Priority Data

Feb. 14, 2013  (IL) .......................................... 224743

(51) Int. Cl.
*G06F 21/14* (2013.01)

(52) U.S. Cl.
CPC ...................................... *G06F 21/14* (2013.01)

(58) Field of Classification Search
None
See application file for complete search history.

(56) References Cited

U.S. PATENT DOCUMENTS

| | | | | |
|---|---|---|---|---|
| 6,594,761 | B1 * | 7/2003 | Chow ...................... | G06F 21/14 713/189 |
| 6,668,325 | B1 * | 12/2003 | Collberg ................. | G06F 21/14 713/194 |
| 2004/0250100 | A1 * | 12/2004 | Agrawal ........... | G06F 17/30545 713/193 |
| 2004/0257454 | A1 * | 12/2004 | Pinto ...................... | G06T 5/006 348/222.1 |
| 2005/0183072 | A1 | 8/2005 | Horning et al. | |
| 2006/0253687 | A1 | 11/2006 | Jakubowski et al. | |
| 2008/0028474 | A1 | 1/2008 | Horne et al. | |
| 2008/0208560 | A1 | 8/2008 | Johnson et al. | |
| 2009/0296922 | A1 * | 12/2009 | Smeets .................... | G06F 21/16 380/28 |
| 2010/0199354 | A1 | 8/2010 | Eker et al. | |
| 2010/0218257 | A1 * | 8/2010 | Oneda ..................... | G06F 21/14 726/26 |
| 2010/0250906 | A1 * | 9/2010 | Singh ...................... | G06F 21/14 712/234 |
| 2012/0284701 | A1 * | 11/2012 | Tsai ........................ | G06F 8/443 717/151 |
| 2013/0097431 | A1 * | 4/2013 | Hriljac ..................... | G06F 8/52 713/189 |
| 2013/0232343 | A1 * | 9/2013 | Horning ................ | G06F 21/125 713/190 |

OTHER PUBLICATIONS

Ding Yi, "a New Obfuscation Scheme in Constructing Fuzzy Predicates," World Congress on Software Engineering, vol. 4 pp. 379-382 (May 2009).

* cited by examiner

*Primary Examiner* — Jue Louie
*Assistant Examiner* — Douglas Slachta
(74) *Attorney, Agent, or Firm* — Hahn Loeser & Parks LLP

(57) ABSTRACT

A computer program obfuscating system including a processor to provide a computer program including at least one computer program variable, and add an opaque predicate to the computer program to obfuscate the computer program so that the opaque predicate added to the computer program comprises at least one polynomial including a polynomial P, during execution of the obfuscated computer program, the polynomial P is evaluated yielding at least one result including a first result R1, and during execution of the obfuscated computer program, the opaque predicate is evaluated based on the at least one result R1 such that a decision as to whether or not to perform the first command is dependent upon comparing the first result R1 to at least one value in accordance with a predetermined mathematical relationship. Related apparatus and methods are also included.

11 Claims, 4 Drawing Sheets

AUTOMATIC COMPUTER PROGRAM OBFUSCATION SYSTEM

RELATED APPLICATION INFORMATION

The present application claims priority from Israel Patent Application No. 224,743 filed 14 Feb. 2013.

FIELD OF THE INVENTION

The present invention relates to computer program obfuscation, and in particular, to adding an opaque predicate to a computer program.

BACKGROUND OF THE INVENTION

The following references are believed to represent the state of the art:

A paper by Ding Yi entitled "A New Obfuscation Scheme in Constructing Fuzzy Predicates," World Congress on Software Engineering, vol. 4, pp. 379-382, 19-21 May 2009;

U.S. Pat. No. 6,668,325 to Collberg, et al.;

US Published Patent Application 2005/0183072 of Horning et al.;

US Published Patent Application 2006/0253687 of Jakubowski et al.;

US Published Patent Application 2008/0028474 of Horne et al.;

US Published Patent Application 2008/0208560 of Johnson et al.;

US Published Patent Application 2009/0296922 of Smeets et al.; and

US Published Patent Application 2010/0199354 of Eker et al.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
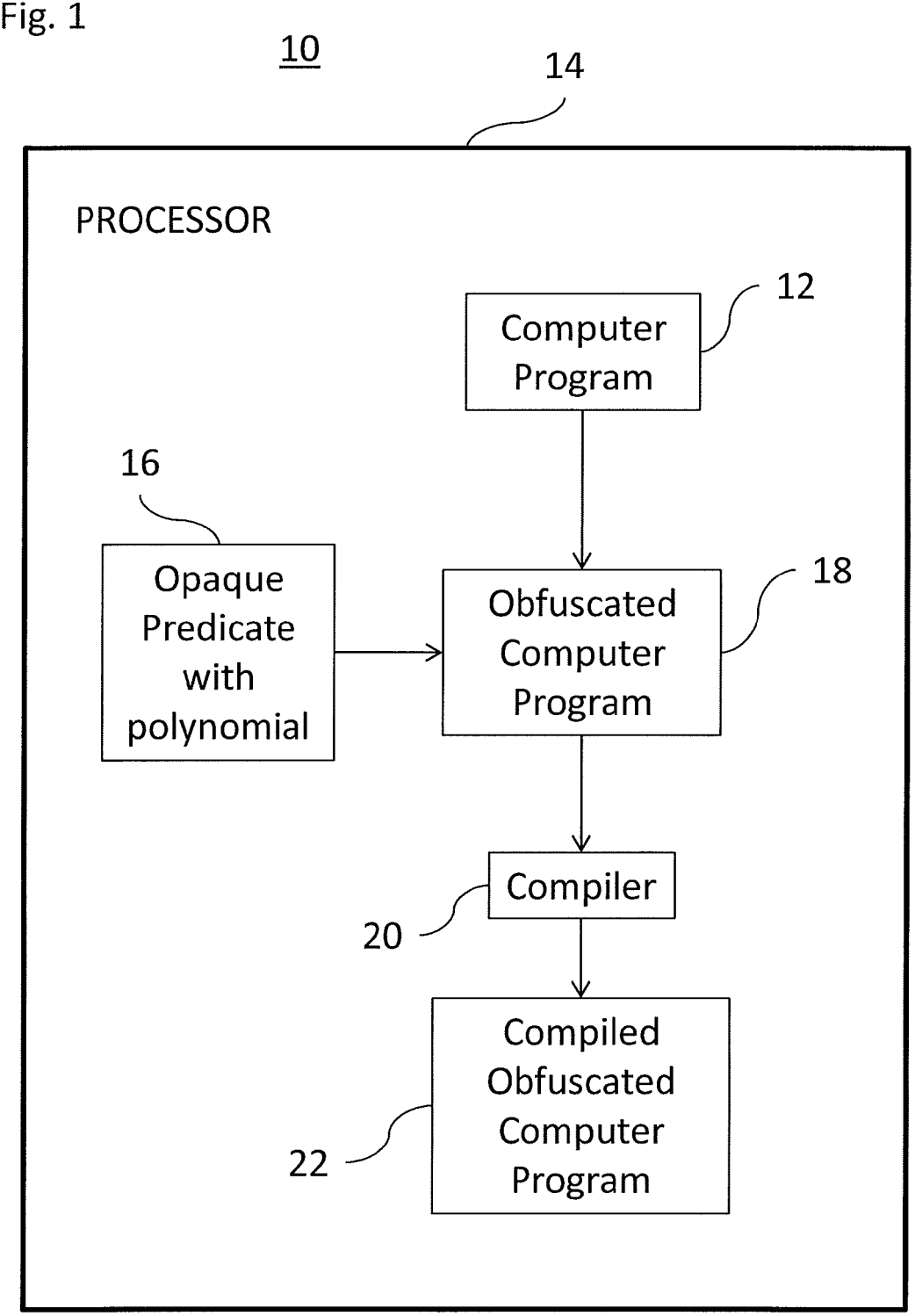
FIG. 1 is a partly pictorial, partly block diagram view of a computer program obfuscation system constructed and operative in accordance with an embodiment of the present invention.

By way of introduction, when obfuscating software, a very useful technique is the replacement of Boolean and integer values that naturally appear in the original program or are added as an earlier stage of the obfuscation, with small opaque calculations or code sections known as opaque predicates, whose expected result is known to the obfuscator but is not easily guessable or understandable by an attacker or even by the compiler compiling the code.

For opaque predicates to be more effective at obfuscation, a large collection of different techniques is generally desirable so as to avoid repeating patterns that could assist an attacker in applying experience gained from investigating one opaque predicate to another. Additionally, it is desirable that the obfuscation code results in a small code footprint, looks similar to natural code and is quick to execute.

In overview, the system of the present invention, in embodiments thereof, describes an automated way to build and add opaque predicates to a computer program. The opaque predicate includes one or more polynomials in at least one indeterminate. Evaluation of the opaque predicate by the obfuscated computer program includes evaluating the polynomial(s) by substituting one or more computer program variables, or value(s) which are a function of the computer program variable(s), used by the computer program into the polynomial(s). The value(s) of the computer program variable(s) are typically not known in advance by the obfuscating system as the value(s) may be constantly changing during execution of the computer program or depend on external inputs unknown at compilation time. The value(s) of the evaluated polynomial(s) are then compared to one or more values in accordance with a predetermined mathematical relationship. The result of this latter evaluation typically determines whether or not a command in the computer program is performed or not. The opaque predicate is typically constructed such that the evaluation of the opaque predicate produces an expected result known to the obfuscator even though the value(s) of the computer program variable(s) are typically not known in advance by the obfuscator. The expected behavior of the opaque predicate is typically based on at least one mathematical property of the polynomial(s) included in the opaque predicate as will be described in more detail below with reference to FIGS. 1-4. Nevertheless, the evaluation of the opaque predicate is not easily guessable or understandable by an attacker or even by the compiler compiling the code. It will become apparent from the more detailed description below that the complexity of the opaque predicate is typically greater as the degree of the polynomial(s) increases.

Additionally, polynomials lend themselves as desirable constructs for opaque predicates because polynomials are generally quick and easy to evaluate, their evaluation involves computation operations common in programs and polynomials in general have many useful mathematical properties that can be used for opaque predicates.

Reference is now made to FIG. 1, which is a partly pictorial, partly block diagram view of a computer program obfuscation system 10 constructed and operative in accordance with an embodiment of the present invention.

The system 10 includes a processor 14. The processor 14 is operative to provide a computer program 12 for obfuscation. It should be noted that the program may be obfuscated at the source code level, while it is being compiled or once it has been compiled (by modifying the program's binary file). The code of the computer program 12 is typically read by the processor 14 from a storage device (not shown) or received via a communication medium from another device or processing element (not shown). The computer program 12 is operative when executed to perform a plurality of commands including a command S. The command S may include any suitable computer program command, for example, but not limited to, a jump instruction or a subroutine call. The computer program 12 includes one or more computer program variables used during execution of the computer program 12.

Then, the processor 14 is operative to add an opaque predicate 16 to the computer program 12 to obfuscate the computer program 12 yielding an obfuscated computer program 18. It will be noted that the processor 14 optionally adds many opaque predicates to the computer program 12 as well as possibly employing other obfuscation techniques.

The opaque predicate 16 added to the computer program 12 includes one or more polynomials including a polynomial P in at least one indeterminate. The polynomial P is generally degree two or more.

The added opaque predicate 16 is prepared by the processor 14 so that during execution of the obfuscated computer program 18, the polynomial P is evaluated by substituting the value(s) of the computer program variable(s), or a function of the value(s) of the computer program variable(s), into the polynomial P yielding at least one result including a result R1. So for example, substituting a value v1 from the computer program 12 for x in a polynomial P(x) will yield a single result (e.g. R1) with value P(v1). Substituting another value v2 from the computer program 12 for x in P(x) will yield another result (e.g. R2) with value P(v2). So the two variables v1 and v2 yield two separate results in the above example. If the polynomial is in two indeterminates, for example, P(x,y) and v1 is substituted for x and v2 for y, evaluation of P(x,y) will yield a single result P(v1,v2).

The added opaque predicate 16 is prepared by the processor 14 so that during execution of the obfuscated computer program 18, the opaque predicate 16 is evaluated based on the results yielded from evaluation by substitution in the polynomial(s) such that a decision as to whether or not to perform the command S is dependent upon comparing the first result R1 (and R2 or more results, if relevant) to one or more values (e.g. a constant, the value(s) of the computer program variable(s), or a function of the value(s) of the computer program variable(s)) in accordance with a predetermined mathematical relationship. In fact, evaluation of the opaque predicate 16 yielding the decision as to whether or not to perform the command S is arranged (manipulated) so that the decision outcome is the same whatever the value(s) of the computer program variable(s) based on one or more properties of the polynomial P (and optionally other polynomial(s) included in the opaque predicate 16) and by configuring the predetermined mathematical relationship based on the property/properties of the polynomial P. As the outcome of evaluating the opaque predicate 16 is pre-determined, adding the opaque predicate 16 to the computer program 12 does not change the functionality of the computer program 12 regarding the outputs of the computer program 12.

It should be noted that the computer program variable(s) may include any suitable value used during execution of the computer program 12, for example, but not limited to, binary representations in memory, memory addresses and pointers or any other suitable value. Therefore, before using the computer program variable(s) for evaluating the opaque predicate 16, a suitable value(s) may need to be extracted from the computer program variable(s) and cast into another value(s), for example using certain bits of a memory address, pointer or binary representation. It should also be noted that a value used in the program, for example, a memory address may be considered as one, two or more computer program variables so that a single memory address may yield one or more values for use in evaluating the opaque predicate 16.

The properties of the polynomial(s) selected by the processor 14 may include one or more of the following, by way of example only: the roots of the polynomial; whether the sign of the polynomial is positive or negative in a certain interval of the polynomial; whether the polynomial is monotonically increasing or monotonically decreasing in a certain interval of the polynomial; and Q(x) divides P(x), where Q is another polynomial.

The processor 14 typically includes a compiler 20 operative to compile the obfuscated computer program 18 yielding a compiled obfuscated computer program 22. It will be appreciated that the compiler 20 may be disposed in a different processor or device.

The above mentioned polynomial properties will now be discussed in more detail.

The polynomial property of "Q dividing P" will now be described in more detail below while the other polynomial properties will be described with reference to FIGS. 2-4.

The above polynomial property will first be illustrated by way of an example.

If $P(x)=x^2-9$ and $Q(x)=x-3$, then $Q(x)$ divides $P(x)$.

The above mathematical property can be further appreciated by substituting example values into the equations as follows. For example, the opaque predicate 16 may include taking a variable b from the computer program 12 and substituting its value into $P(x)$ and $Q(x)$. If $b=5$, then $P(x=5)$ evaluates to 16 and $Q(x=5)$ evaluates to 2. Therefore, $Q(x=5)$ divides $P(x=5)$ exactly without any remainder. In other words, $P(x=5)$ is an integer multiple of $Q(x=5)$.

The polynomials $P(x)$ and $Q(x)$ may generally be determined by the following method.

Pick m polynomials in k indeterminates $Q_1(x_1, \ldots x_k), \ldots Q_m(x_1, \ldots x_k)$.

Determine $P(x_1, \ldots x_k)$ to be the product of $Q_1, \ldots Q_m$.

It then follows that for any $i=1, \ldots m$, $Q_i(x_1, \ldots x_k)$ divides $P(x_1, \ldots x_k)$ exactly without any remainder.

For example, with $m=2$, $k=2$, $Q_1(x_1,x_2)=x_1-x_2$, and $Q_2(x_1,x_2)=x_1+x_2$ the result is that $P(x_1,x_2)=x_1^2-x_2^2$. In such a case $Q_1(x_1,x_2)$ divides $P(x_1,x_2)$ and $Q_2(x_1,x_2)$ divides $P(x_1,x_2)$. The above mathematical property may not be observed in certain circumstances, for example when the coefficients of the polynomials are non-integers or the value(s) substituted into the polynomials are non-integers. Therefore, the coefficients of the polynomials should be chosen carefully and prior to substituting the value(s) of the computer program variables into $P(x)$ and/or $Q(x)$ the value(s) of the computer program variable(s) may need to be rounded up or down to produce an integer values(s).

Therefore, a computer program variable value or values (or a function thereof), may be taken from the computer program 12 and substituted into $Q(x)$ and $P(x)$ during execution of the obfuscated computer program 18. The resulting values $Q(x)$ and $P(x)$ are then tested to see if value of $Q(x)$ divides the value of $P(x)$ (as expected), command S is, or is not, performed.

The following is an example in pseudo-code format:

```
// p(x) = (x-3)(x+2) = x^2-x-6 divides q(x) = (x^2-x-6)(x+4)=x^3-x^2-6x+4x^2-4x-24=x^3+3x^2-10x-24
    x1 = (int)(p) % 41 + 5; // for p some pointer in the program.
Taking the modulus to avoid overflow when raising to third power, and adding 5 to avoid the case where the modulus is zero (as would happen here for x = 3)
    if (x1*x1*x1+3*x1*x1-10*x1-24 % x1*x1-x1-6 == 0 && cond)
    {
    ...
    }
```

Therefore, when the polynomial property of "Q divides P" is utilized, the processor 14 is operative to add the opaque predicate 16 to the computer program 12 such that the polynomials added to the computer program 12 includes a polynomial Q in one or more indeterminates as well as the polynomial P such that Q divides P.

Therefore, the processor 14 is operative to add the opaque predicate 16 to the computer program 12 such that during execution of the obfuscated computer program 18, the polynomial P is evaluated by substituting the value(s) of the computer program variable(s), or a function of the value(s) of the computer program variable(s), into the polynomial P yielding a result R1 and the polynomial Q is evaluated by substituting the value(s) of the computer program variable(s), or a function of the value(s) of the computer program variable(s), into the polynomial Q yielding a result R2.

Additionally, the processor 14 is operative to add the opaque predicate 16 to the computer program 12 such that during execution of the obfuscated computer program 18, the opaque predicate 16 is evaluated based on the result R1 and the result R2 such that a decision as to whether or not to perform the command S is dependent upon comparing the result R1 and the result R2 to one or more values in accordance with a predetermined mathematical relationship, for example, by checking whether R2 divides R1, or not.

Figure 2:
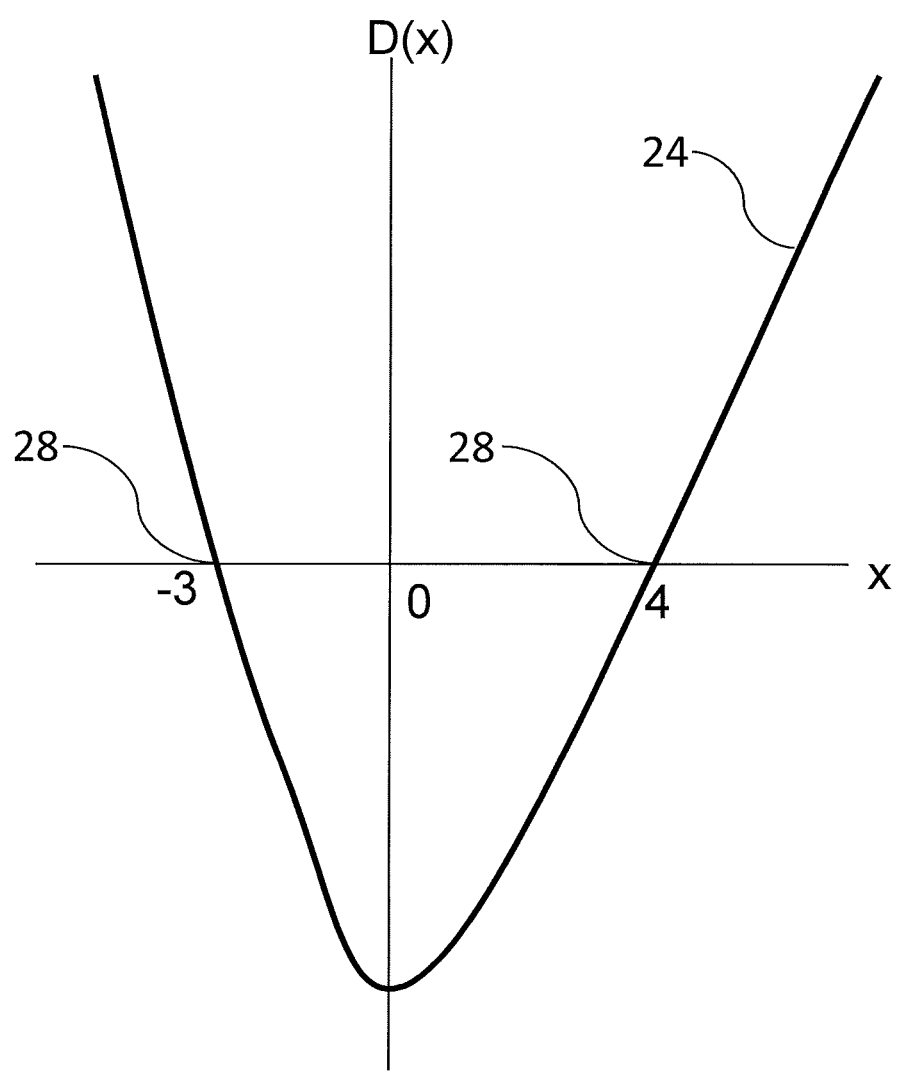
FIG. 2 is a view of a polynomial for use in the system of FIG. 1.
Figure 3:
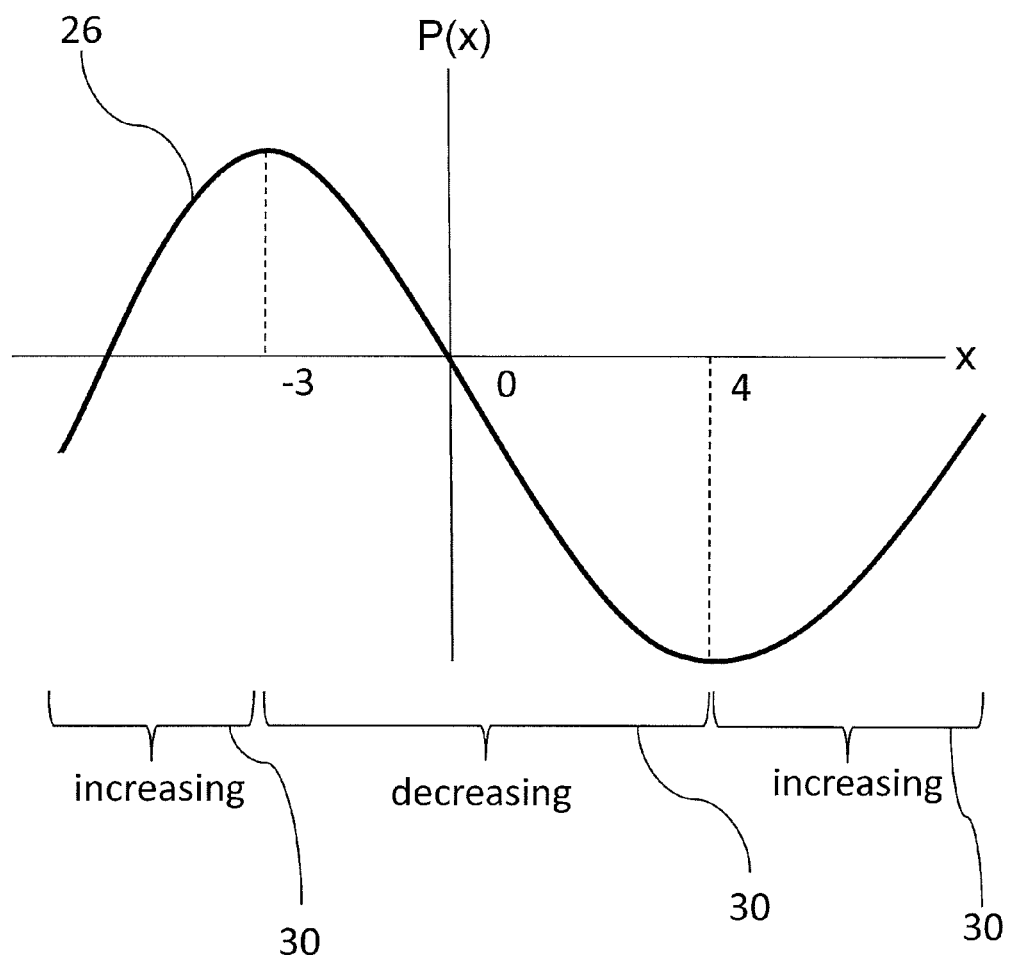
FIG. 3 is a view of another polynomial derived from the polynomial of FIG. 2 for use in the system of FIG. 1.

FIGS. 2 and 3 now discuss how to base evaluation of the opaque predicate 16 on a different polynomial property, namely, whether the polynomial P is monotonically increasing or decreasing in a certain interval of the polynomial P.

Reference is now made to FIG. 2, which is a view of a polynomial D(x) 24 for use in the system 10 of FIG. 1.

A convenient method for determining a suitable polynomial P(x) is to start with a polynomial D(x) 24. The polynomial D(x) 24 is constructed as follows. Select a degree d which is greater than or equal to 2 for the polynomial D(x) 24. Choose d roots $r_1 \ldots r_d$ for the polynomial D(x) 24, such that $D(x)=(x-r_1)(x-r_2) \ldots (x-r_d)$.

FIG. 2 shows an example degree 2 polynomial D(x) 24 with roots 28 at $x=-3$ and $x=4$. Therefore, the equation of D(x) is $(x+3)(x-4)=x^2-x-12$.

Reference is now made to FIG. 3, which is a view of a polynomial P(x) 26 derived from the polynomial D(x) 24 of FIG. 2 for use in the system 10 of FIG. 1.

The polynomial P(x) 26 is typically determined as the indefinite integral of the polynomial D(x) 24 (FIG. 2). The free coefficient of P(x) can be chosen arbitrarily. P(x) has as its local extrema at the values $r_1, \ldots r_d$. The polynomial P(x) 26 includes a plurality of intervals 30. The intervals 30 include an interval 30 where x is less than $r_1$, an interval 30 where x is greater than $r_d$ and one or more intervals 30 for values of x between $r_i$ and $r_{i+1}$ where i is an integer greater than, or equal, to 1 and less than d. In each of the intervals 30, the polynomial P(x) 24 is either monotonically increasing or decreasing based on the sign of D(x) 26 (FIG. 2) in the relevant interval 30.

The above paragraph will now be illustrated based on the example shown in FIG. 3, where the polynomial P(x) 26 is the indefinite integral of the polynomial D(x) 24 of FIG. 2. The example polynomial P(x) 26 shown in FIG. 3 is given by the equation $P(x)=\frac{1}{3}x^3-\frac{1}{2}x^2-12x$. The polynomial P(x) has a maximum at $x=-3$ and a minimum $x=4$. In the interval 30 between $x=-3$ and $x=4$ the polynomial P(x) 26 is monotonically decreasing which corresponds to the polynomial D(x) 24 (FIG. 2) being negative in the interval 30 between $x=-3$ and $x=4$. In the interval 30 less than $x=-3$, the polynomial P(x) 26 is monotonically increasing. Similarly, in the interval 30 greater than $x=4$, the polynomial P(x) 26 is monotonically increasing.

The above property of the polynomial P(x) 26 may be exploited in the evaluation of the opaque predicate 16 as follows.

Select two computer program variables b and c from the computer program 12 (FIG. 1). The values of b and c have real values which may be integers or floating point. The values of b and c may be unknown to the obfuscation system 10 (FIG. 1) at the time the opaque predicate 16 (FIG. 1) is added to the computer program 12.

Select one of the intervals 30.

As one or more of the computer program variables b and c may not fall within the selected interval 30 a transformation is applied, such as an affine mapping, that will translate b and c to F(b) and F(c) such that F(b) and F(c) are both in the selected interval 30. It will become apparent from the description below that F(b) and F(c) must not have the same value. So for example, if b and c have the same value then either the opaque predicate is not processed or the values b and c are processed to produce different values for F(b) and F(c).

If the selected interval 30 is between $r_i$ and $r_{i+1}$, the function F(x) may be:

$$F(x)=[\{r_i+r_{i+1}\}/2]+\sin(x)*[\{r_{i+1}-r_i\}/2]$$

$$F(x)=r_i+(x \bmod (r_{i+1}-r_i))$$

Based on the above properties of the polynomial P(x) 26, it will be appreciated that the sign of the mathematical ratio:

$$\frac{P(F(b))-P(F(c))}{F(b)-F(c)}$$

is positive when P(x) is monotonically increasing in the selected interval 30 and negative when P(x) is monotonically decreasing in the selected interval 30. Alternatively, if P(x) is monotonically increasing, then if P(F(b)) is greater than P(F(c)) then F(b) will be greater than F(c) and if P(x) is monotonically decreasing, then if P(F(b)) is greater than P(F(c)) then F(b) will be less than F(c) etc. The mathematical ratio, or equivalent, based on the above properties of the polynomial P(x) 26 may be used in the opaque predicate 16 (FIG. 1) to manipulate the decision of determining whether the command S should be performed or not.

This may be illustrated by the example of FIG. 3.

In the example of FIG. 3, it is known that the polynomial P(x) 26 is monotonically decreasing in the interval 30 between $x=-3$ and $x=4$. Therefore, the above mathematical ratio, or equivalent, may be used in the opaque predicate 16 (FIG. 1) to see if the sign of the ratio:

$$\frac{P(F(b))-P(F(c))}{F(b)-F(c)}$$

is negative (the expected result in the selected interval 30) or positive (which will not occur with this interval 30) to decide whether or not to perform the command S (and possibly perform another command).

For polynomials of high enough degree, for example, 5 or greater, the roots of the polynomial D(x) 24 cannot be determined analytically and therefore the areas where the polynomial P(x) 26 is increasing or decreasing cannot be determined analytically, and an attacker trying to reverse-engineer the opaque predicate 16 (FIG. 1) may have to resort to dynamic reverse-engineering or to numerical analysis to understand the value of the opaque predicate 16.

Note that care must be taken to handle the cases of integer variable overflows and floating point precision issues when applying P(x) at F(b) and F(c).

The operation of the processor 14 (FIG. 1) with regard to the polynomial property of whether the polynomial P is monotonically increasing or monotonically decreasing in a certain interval of the polynomial P is now described in more detail.

The processor 14 (FIG. 1) is operative to select a degree d of the polynomial D(x) 24 (FIG. 2). The processor 14 is then operative to select the roots of the polynomial D(x) 24. The processor 14 is then operative to perform an indefinite integral of the polynomial D(x) 24 yielding the polynomial P(x) 26.

The processor 14 (FIG. 1) is then operative to select an interval 30 of the polynomial P(x) 26.

The processor 14 (FIG. 1) is operative to determine whether the polynomial P(x) 26 is monotonically increasing or monotonically decreasing in the selected interval 30 of the polynomial P(x) 26. The processor 14 is operative to select computer program variables b and c which are used during execution of the computer program 12 (FIG. 1).

The processor 14 (FIG. 1) is operative to add the opaque predicate 16 to the computer program 12 (FIG. 1) such that during execution of the obfuscated computer program 18: (a) a value of F(b) is calculated where F is a function which translates an input into the selected interval 30 of the polynomial P(x) 26; (b) a value of F(c) is calculated; (c) the polynomial P(x) 26 is evaluated by substituting the value of F(b) into the polynomial P(x) 26 yielding a result R1; (d) the polynomial P(x) 26 is evaluated by substituting the value of F(c) into the polynomial P(x) 26 yielding a result R2.

The processor 14 (FIG. 1) is operative to add the opaque predicate 16 (FIG. 1) to the computer program 12 (FIG. 1) such that during execution of the obfuscated computer program 18 (FIG. 1), the opaque predicate 16 is evaluated based on the result R1 and the result R2 such that a decision as to whether or not to perform the command S is dependent upon comparing the result R1 and the result R2 to one or more values in accordance with a predetermined mathematical relationship, for example, but not limited to, determining whether {R1−R2}/{F(b)−F(c)} is positive or negative or if P(x) is monotonically increasing in the selected interval 30, then if R1 is greater than R2 then F(b) will be greater than F(c) and if P(x) is monotonically decreasing in the selected interval 30, then if R1 is greater than R2 then F(b) will be less than F(c) etc.

The following is example in pseudo-code format:

```
               // y =(x−3)(x−7) = x^2 − 10x + 21 decreases for x < 5
increases for x > 5 so
               // this construction takes if(cond) and replaces it with the
following opaque predicate
               x1 = v1*v1 + 7; // for some existing integer v1 in the
program
               x2 = abs(v2) + 10; // for some existing integer v2 in the
program
               if ((x1*x1 − 10*x1 + 21) < (x2*x2 − 10*x2 + 21) == x1 <
x2 && cond) // for some existing conditional
               {
               ...
               }
```

Figure 4:
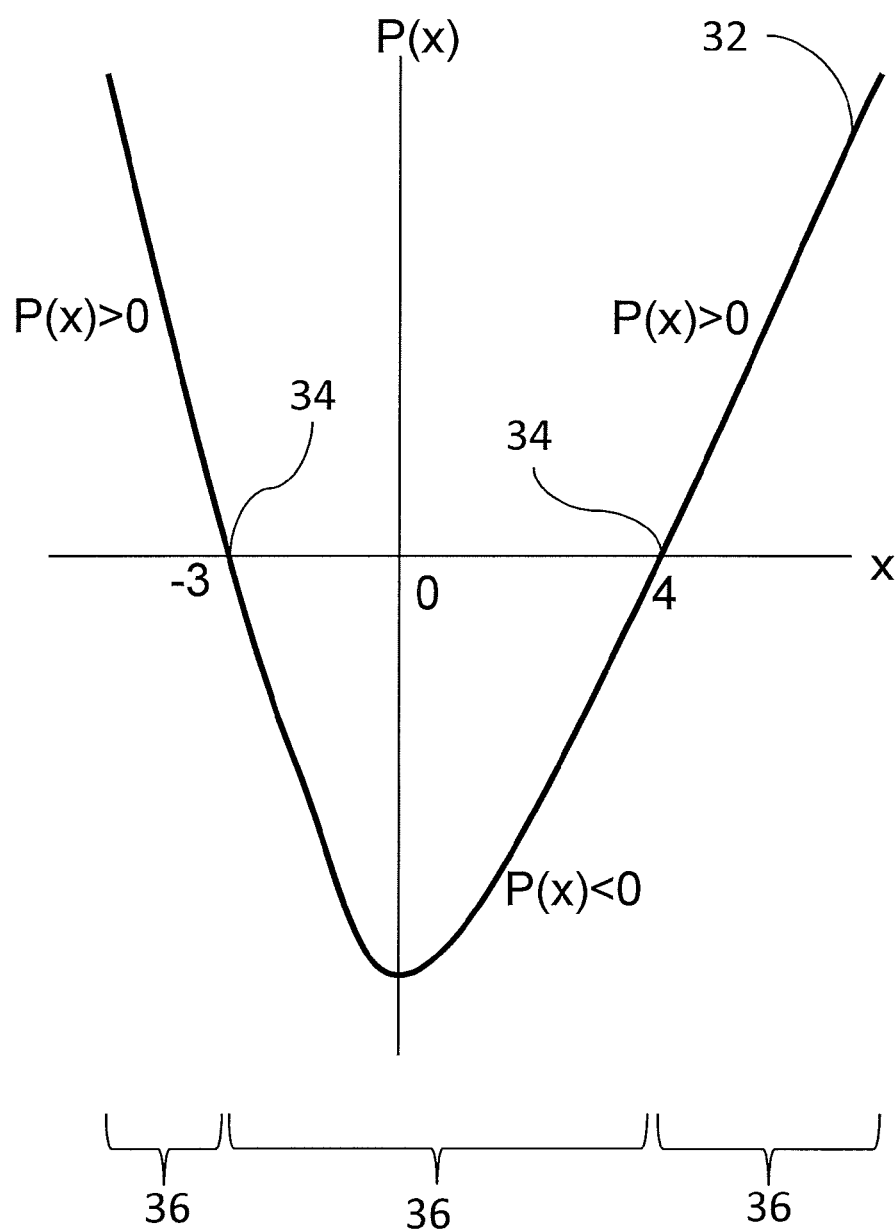
FIG. 4 is a view of yet another polynomial for use in the system of FIG. 1.

Reference is now made to FIG. 4, which is a view of a polynomial P(x) 32 for use in the system 10 of FIG. 1.

FIG. 4 now discusses how to base evaluation of the opaque predicate 16 (FIG. 1) on a different polynomial property, namely, whether the sign of the polynomial P(x) 32 is positive or negative in a certain interval of the polynomial P(x) 32.

A convenient method for determining a suitable polynomial P(x) is to select a degree d which is greater than or equal to 2 for the polynomial P(x) 32. Choose d roots $r_1 \ldots r_d$ for the polynomial P(x) 32, such that $P(x)=(x-r_1)(x-r_2) \ldots (x-r_d)$.

The polynomial P(x) 32 includes a plurality of intervals 36. The intervals 36 include an interval 36 where x is less than $r_1$, an interval 30 where x is greater than $r_d$ and one or more intervals 36 for values of x between $r_i$ and $r_{i+1}$ where i is an integer greater than, or equal, to 1 and less than d.

FIG. 4 shows an example degree 2 polynomial P(x) 32 with roots 34 at x=−3 and x=4. Therefore, the equation of the polynomial P(x) 32 is:

$$(x+3)(x-4)=x^2-x-12.$$

In the example of FIG. 4, the polynomial P(x) 32 is negative in the interval 36 between the roots 34, and positive in the interval 36 where x is less than −3 and positive in the interval 36 where x is greater than 4.

The above property of the polynomial P(x) 32 may be exploited in the evaluation of the opaque predicate 16 (FIG. 1) as follows.

Select a computer program variable b from the computer program 12 (FIG. 1). The value of b has a real value which may be an integer or floating point. The value of b may be unknown to the obfuscation system 10 (FIG. 1) at the time the opaque predicate 16 (FIG. 1) is added to the computer program 12.

Select one of the intervals 36 in which the polynomial P(x) 32 will be evaluated.

Apply a transformation, such as an affine mapping, that will translate b to F(b) so that F(b) falls in the interval 36 between $r_i$ and $r_{i+1}$.

Determine whether the sign of the polynomial P(x) 32 is positive or negative in the selected interval 36.

The determination of whether the sign of the polynomial P(x) 32 is positive or negative in the selected interval 36 may be used in the opaque predicate 16 (FIG. 1) to fix the decision of determining whether the command S should be performed or not as will be described in more detail below.

If the polynomial P(x) 32 is degree 5 or more it is generally impossible to analytically find the roots 34 of the polynomial P(x) 32 and thus to know where the polynomial P(x) 32 is positive or negative without evaluating the polynomial P(x) 32 at a certain point. Therefore, it may be advantageous to select the polynomial P(x) 32 to be a degree 5 or more polynomial.

As a generalization, k different variables x1, . . . xk can mapped to different regions x'_1, . . . x'_k and their signs (positive or negative) calculated.

The operation of the processor 14 (FIG. 1) with regard to the polynomial property of whether the sign of the polynomial P(x) 32 is positive or negative in a certain interval of the polynomial P(x) 32 is now described in more detail.

The processor 14 (FIG. 1) is operative to select a degree d of the polynomial P(x) 32. The processor 14 is then operative to select the roots of the polynomial P(x) 32. The processor 14 (FIG. 1) is then operative to select an interval 36 of the polynomial P(x) 32.

Then the processor 14 (FIG. 1) is operative to determine whether the sign of the polynomial P(x) 32 is positive or negative in the selected interval 36 of the polynomial P(x) 32. The processor 14 is operative to select a computer program variable b which is used during execution of the computer program 12 (FIG. 1).

Then the processor 14 (FIG. 1) is operative to add the opaque predicate 16 (FIG. 1) to the computer program 12 (FIG. 1) such that during execution of the obfuscated computer program 18 (FIG. 1): (a) a value of F(b) is calculated where F is a function which translates b into the selected interval 36 of the polynomial P(x) 32; (b) the polynomial P(x) 32 is evaluated by substituting the value of F(b) into the polynomial P(x) 32 yielding a result R1; and (c) the opaque predicate 16 (FIG. 1) is evaluated based on the result R1 such that a decision as to whether or not to perform the command S is dependent upon whether the sign of the result R1 is positive or negative or by evaluating an equivalent mathematical relationship.

The following is example in pseudo-code format:

```
            // y = (x−1)(x−4) = x^2 −5x + 4 is positive for x > 4, x < 1,
negative for 1 < x < 4
            // therefore this construction takes if(cond) and replace it
with the following opaque predicate
            x1 = (v1 % 2) + 1.5; // for some existing integer v1 in the
program
            if (x1*x1 − 5*x1 + 4 > 0 || cond)
            {
            ...
            }
```

It will be appreciated that stronger obfuscation can be achieved by mixing the various techniques described in FIGS. 1-4 together in any suitable combination, so as to avoid repetition and patterns that will assist an attacker in applying experience gained from investigating one opaque predicate to another.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A computer program obfuscating system comprising a hardware processor including a memory, the hardware processor being operative to:
   provide a computer program performing a plurality of commands including a first command, the computer program including at least one computer program variable used during execution of the computer program; and then
   add an opaque predicate to the computer program to obfuscate the computer program so that:
   the opaque predicate added to the computer program comprises at least one polynomial including a polynomial P in at least one indeterminate, the polynomial P being a degree two or more polynomial;
   during execution of the obfuscated computer program, the polynomial P is evaluated by substituting the value or values of the at least one computer program variable, or a function of the value or values of the at least one computer program variable, into the polynomial P yielding at least one result including a first result R1; and
   during execution of the obfuscated computer program, an interval of the polynomial P is selected, and the opaque predicate is evaluated based on the at least one result R1 such that a decision as to whether or not to perform the first command is dependent upon comparing the first result R1 to at least one value in accordance with a predetermined mathematical relationship, wherein the predetermined mathematical relationship is based on at least one property of the polynomial P and wherein the at least one property of the polynomial P includes at least one of the following: whether the sign of the polynomial P is positive or negative in the selected interval of the polynomial P; whether the polynomial P is monotonically increasing or monotonically decreasing in the selected interval of the polynomial P; and whether Q divides P where Q is a polynomial that is included in the opaque predicate; wherein
   the at least one computer program variable includes a variable b and a variable c;
   the processor is operative to determine whether the polynomial P is monotonically increasing or monotonically decreasing in the selected interval of the polynomial P; and
   the processor is further operative to add the opaque predicate to the computer program such that during execution of the obfuscated computer program: a value of F(b) is calculated where F is a function which translates an input into the selected interval of the polynomial P; a value of F(c) is calculated; the polynomial P is evaluated by substituting the value of F(b) into the polynomial P yielding the first result R1; the polynomial P is evaluated by substituting the value of F(c) into the polynomial P yielding a second result R2; and the opaque predicate is evaluated based on the first result R1 and the second result R2 such that the decision as to whether or not to perform the first command is dependent upon comparing the first result R1 and the second result R2 to the at least one value in accordance with the predetermined mathematical relationship.

2. The system according to claim 1, wherein adding the opaque predicate to the computer program does not change the functionality of the computer program regarding the outputs of the computer program.

3. The system according to claim 1, wherein the processor is operative to add the opaque predicate to the computer program such that during execution of the obfuscated computer program, the opaque predicate is evaluated based on the first result R1 and the second result R2 such that the decision as to whether or not to perform the first command is dependent upon whether the sign of $$\frac{R1 - R2}{F(b) - F(c)}$$

is positive or negative.

4. The system according to claim 1, wherein the processor is operative to add the opaque predicate to the computer program to obfuscate the computer program so that during execution of the computer program, evaluation of the opaque predicate yielding the decision as to whether or not to perform the first command is arranged so that the decision outcome is the same whatever the value or values of the at least one computer program variable.

5. The system according to claim 4, wherein the decision as to whether or not to perform the first command is arranged, so that the decision outcome is the same whatever the value or values of the at least one computer program variable, by configuring the predetermined mathematical relationship based on at least one property of the polynomial P.

6. The system according to claim 5, wherein the at least one property of the polynomial includes the roots of the polynomial P.

7. The system according to claim 1, wherein:
the processor is operative to determine whether the sign of the polynomial P is positive or negative in a certain interval of the polynomial P;
the at least one computer program variable includes a variable b; and
the processor is operative to add the opaque predicate to the computer program such that during execution of the obfuscated computer program:
a value of F(b) is calculated where F is a function which translates b into the certain interval of the polynomial P; and
the polynomial P is evaluated by substituting the value of F(b) into the polynomial P yielding the first result R1.

8. The system according to claim 7, wherein the processor is operative to add the opaque predicate to the computer program such that during execution of the obfuscated computer program, the opaque predicate is evaluated based on the first result R1 such that the decision as to whether or not to perform the first command is dependent upon whether the sign of the first result R1 is positive or negative.

9. The system according to claim 1, wherein:
the processor is operative to add the opaque predicate to the computer program such that the at least one polynomial added to the computer program includes a polynomial Q in at least one indeterminate such that Q divides P; and
the processor is operative to add the opaque predicate to the computer program such that during execution of the obfuscated computer program:
the polynomial P is evaluated by substituting the value or values of the at least one computer program variable, or a function of the value or values of the at least one computer program variable, into the polynomial P yielding the first result R1;
the polynomial Q is evaluated by substituting the value or values of the at least one computer program variable, or a function of the value or values of the at least one computer program variable, into the polynomial Q yielding a second result R2; and
the opaque predicate is evaluated based on the first result R1 and the second result R2 such that the decision as to whether or not to perform the first command is dependent upon comparing the first result R1 and the second result R2 to the at least one value in accordance with the predetermined mathematical relationship.

10. The system according to claim 9, wherein the processor is operative to add the opaque predicate to the computer program such that during execution of the obfuscated computer program the opaque predicate is evaluated based on the first result R1 and the second result R2 such that the decision as to whether or not to perform the first command is dependent upon whether R2 divides R1 or not.

11. An obfuscating method comprising:
providing a computer program performing a plurality of commands including a first command, the computer program including at least one computer program variable used during execution of the computer program, the at least one computer program variable including a variable b and a variable c; and then
adding an opaque predicate to the computer program to obfuscate the computer program so that:
the opaque predicate added to the computer program comprises at least one polynomial including a polynomial P in at least one indeterminate, the polynomial P being a degree two or more polynomial;
during execution of the obfuscated computer program, the polynomial P is evaluated by substituting the value or values of the at least one computer program variable, or a function of the value or values of the at least one computer program variable, into the polynomial P yielding at least one result including a first result R1;
during execution of the obfuscated computer program, an interval of the polynomial P is selected, and the opaque predicate is evaluated based on the at least one result R1 such that a decision as to whether or not to perform the first command is dependent upon comparing the first result R1 to at least one value in accordance with a predetermined mathematical relationship, wherein the predetermined mathematical relationship is based on at least one property of the polynomial P and wherein the at least one property of the polynomial P includes at least one of the following: whether the sign of the polynomial P is positive or negative in the selected interval of the polynomial P; whether the polynomial P is monotonically increasing or monotonically decreasing in the selected interval of the polynomial P; and whether Q divides P where Q is a polynomial that is included in the opaque predicate;
determining whether the polynomial P is monotonically increasing or monotonically decreasing in the selected interval of the polynomial P; and
adding the opaque predicate to the computer program such that during execution of the obfuscated computer program: a value of F(b) is calculated where F is a function which translates an input into the selected interval of the polynomial P; a value of F(c) is calculated; the polynomial P is evaluated by substituting the value of F(b) into the polynomial P yielding the first result R1; the polynomial P is evaluated by substituting the value of F(c) into the polynomial P yielding a second result R2; and the opaque predicate is evaluated based on the first result R1 and the second result R2 such that the decision as to whether or not to perform the first command is dependent upon comparing the first result R1 and the second result R2 to the at least one value in accordance with the predetermined mathematical relationship.

* * * * *

UNITED STATES PATENT AND TRADEMARK OFFICE
CERTIFICATE OF CORRECTION

PATENT NO. : 9,317,667 B2
APPLICATION NO. : 13/945264
DATED : April 19, 2016
INVENTOR(S) : Cain et al.

Page 1 of 1

It is certified that error appears in the above-identified patent and that said Letters Patent is hereby corrected as shown below:

In the specification,

Column 6, line 14, delete "$r_1$ and $r_{i+1}$," and substitute therefor -- $r_i$ and $r_{i+1}$, --.

Signed and Sealed this
Fourteenth Day of June, 2016

Michelle K. Lee
*Director of the United States Patent and Trademark Office*